March 1, 1960    R. E. P. MIERS    2,926,704
SPRING ASSEMBLING MACHINE

Filed July 5, 1957    13 Sheets-Sheet 2

RICHARD EUSTACE PROBYN MIERS
INVENTOR.

by Richardson, Davis and Nudon
ATTORNEYS.

INVENTOR:
RICHARD EUSTACE PROBYN MIERS

March 1, 1960

R. E. P. MIERS 2,926,704

SPRING ASSEMBLING MACHINE

Filed July 5, 1957

INVENTOR:
RICHARD EUSTACE PROBYN MIERS
By
Richardson, David and Nardon
ATTY'S.

March 1, 1960

R. E. P. MIERS 2,926,704

SPRING ASSEMBLING MACHINE

Filed July 5, 1957

Richard Eustace Probyn Miers
INVENTOR
by Richardson, David and Nordon
his ATTORNEYS

United States Patent Office 2,926,704
Patented Mar. 1, 1960

2,926,704

SPRING ASSEMBLING MACHINE

Richard E. P. Miers, London, England

Application July 5, 1957, Serial No. 670,175

Claims priority, application Great Britain July 6, 1956

15 Claims. (Cl. 140—3)

This invention relates to a machine for assembling furniture spring assemblies for mattresses and like interiors, each assembly comprising a number of parallel rows of helical or hour-glass type furniture springs coupled together by a plurality of tie wires which are parallel with and which alternate with the rows of springs, each such tie wire having a number of equi-distantly spaced substantially S-shaped hook-like parts which are interlaced with the slightly overlapping end convolutions of the rows of springs.

Each successive pair of rows of springs has two parallel tie wires.

In my co-pending patent application Ser. No. 482,308, filed January 17, 1955, now Patent No. 2,835,281, of which this application is a continuation-in-part, hereinafter referred to as the "parent patent" there is described a machine which assembles the tie wires on to the successive rows of springs by gripping such tie wires (already provided with the S-shaped hook-like parts) at their ends and then rotating them in clock-wise and counter clock-wise directions in order to interlace them with the ends of the springs which have been brought to their required over-lapping configuration. Once the tie wires have been assembled on to the springs the whole assembly is sufficiently rigid to maintain itself but it is normally necessary to clinch the hooks of the tie wires in order to prevent the assembly breaking up in use.

According to the present invention there is provided a method of producing spring assemblies comprising assembling lines of springs and coupling the end convolutions of such springs by tie wires having pre-formed hook-like parts, translating the assembly away from the coupling stage ready to receive a further row of springs for coupling to the trailing row of the assembly, and during such translation effecting automatically the clinching of the said hook-like parts onto their associated springs.

According to a further aspect of the invention there is provided clinching mechanism as part of a machine for assembling furniture spring assemblies characterised by first and second clinching jaws movable relatively to each other and relatively to a fixed part of the machine in accordance with a predetermined schedule, said schedule causing the first clinching jaw to engage a linked assembly comprising two furniture springs and the sinuous, e.g. S-shaped hook-like part of a tie wire interlaced therewith and to draw the same away from the position at which interlacing occurs and into engagement with the second clinching jaw to effect clinching, whereafter the first clinching jaw returns to the original position.

In carrying the invention into practice in the form in which it is designed as an attachment to the machine of the parent patent, the means for offering the tie wires to the work and for imparting rotation to them about their axes in the manner necessary to interlace them with the overlapping end convolutions of the springs is the same as that described and illustrated in the parent patent. Thus the present invention is chiefly concerned with the manner in which the springs are located and deformed so as to receive the tie wires and also with the means whereby the springs, after being interlaced with the tie wires, are drawn aside the necessary distance to enable the new line of springs to be fed into the machine, the clinching of the tie wire hooks taking place automatically during the sequence of operations.

In order that this invention may more fully be understood, two embodiments of apparatus for carrying the same into effect will now be described, such apparatus forming a part of the machine of the parent patent. Furthermore, in order to simplify the drawings only the mechanism associated with the tie wires at the bases of the springs is shown, it being understood that the mechanism for the top convolutions of the springs is normally the obverse to that shown. The description is with reference to the accompanying drawings, in which.

Figure 8:
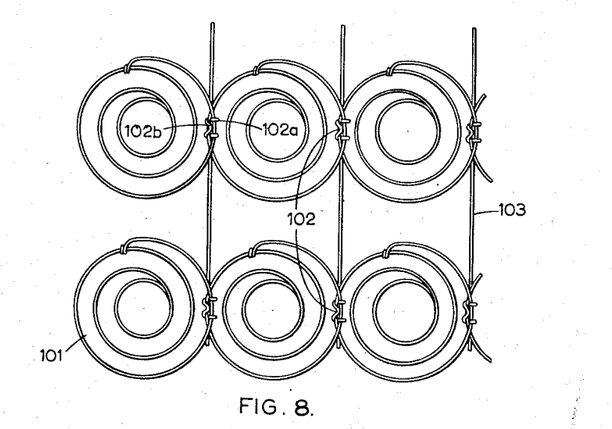
Figure 8 is a plan view of a portion of a spring assembly to be produced by means of the present invention.
Figure 9:
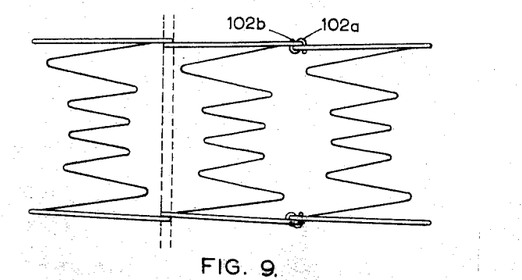
Figure 9 is a side elevation of Figure 8.
Figure 10:
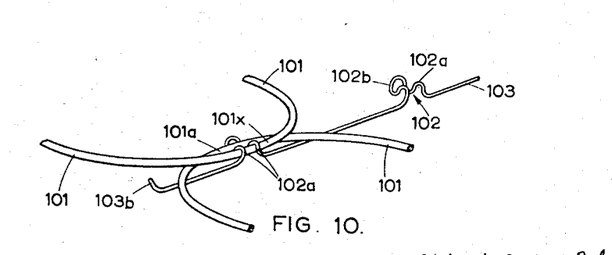
Figure 10 is a perspective view of a part of a tie wire to be clinched by the machine of the present invention to the furniture springs.

Referring firstly to Figures 8–10 of the drawings it will be seen with reference to Figures 8 and 9 that the spring assembly in its finished form has a number of parallel lines of rows of springs 101 of the furniture spring type, i.e. with their end convolutions of greater diameter than the remaining convolutions, the springs being secured together so that for each row taking a line passing through their axes when looking at Figure 8 each spring 101, with the exception of the two end springs at a relatively short portion 101a (see Figure 10) of its periphery at both ends engages against the inner side of the like portion 101x of the adjacent spring, whilst at the diametrically opposed part of the spring the relationship is reversed. The springs are held in this partially overlapping arrangement of their end convolutions by substantially S-shaped hook-like projections 102 of tie wires 103 which by means of the machine described in the said parent patent are inter-engaged with the spring end convolutions as shown against one of the hook-like projections 2 in Figure 10, whereupon the complete assembly of springs and tie wires making up e.g. a complete unit ready for insertion in a mattress cover, is fed through a machine which clinches the projections 102 tightly to the overlapping parts of the spring ends to produce the unit shown in Figure 8. The present invention is concerned primarily with an addition to a machine such as e.g.

that described in the said parent patent which feeds the tie wires in the described sequence to rows of springs in succession and mechanically effects the operations which produce inter-engagement of the tie wires with the spring end convolutions and consequently the said addition brings into such a machine as that of the said parent patent clinching means for the hook parts 102 of the tie wires with means, hereinafter described, which feeds the progressively assembled rows of springs and tie wires away from the stage where the tie wires are interengaged with the springs.

It will be appreciated from the foregoing that the machine of the present invention must in common with the machine of the said parent patent provide for assembling successive rows of springs and to feed to each row an upper and a lower tie wire, then to ensure that the springs are temporarily deformed to locate their end convolutions in such relationship to the tie wires and to the next row of springs that by rotating the tie wires on their axes in a particular manner the S-shaped hook-like projections 102 will so inter-engage with the spring ends that thereupon the rows of springs can be drawn forwards to position the trailing row in the machine ready to repeat the cycle of operations.

Figure 11:
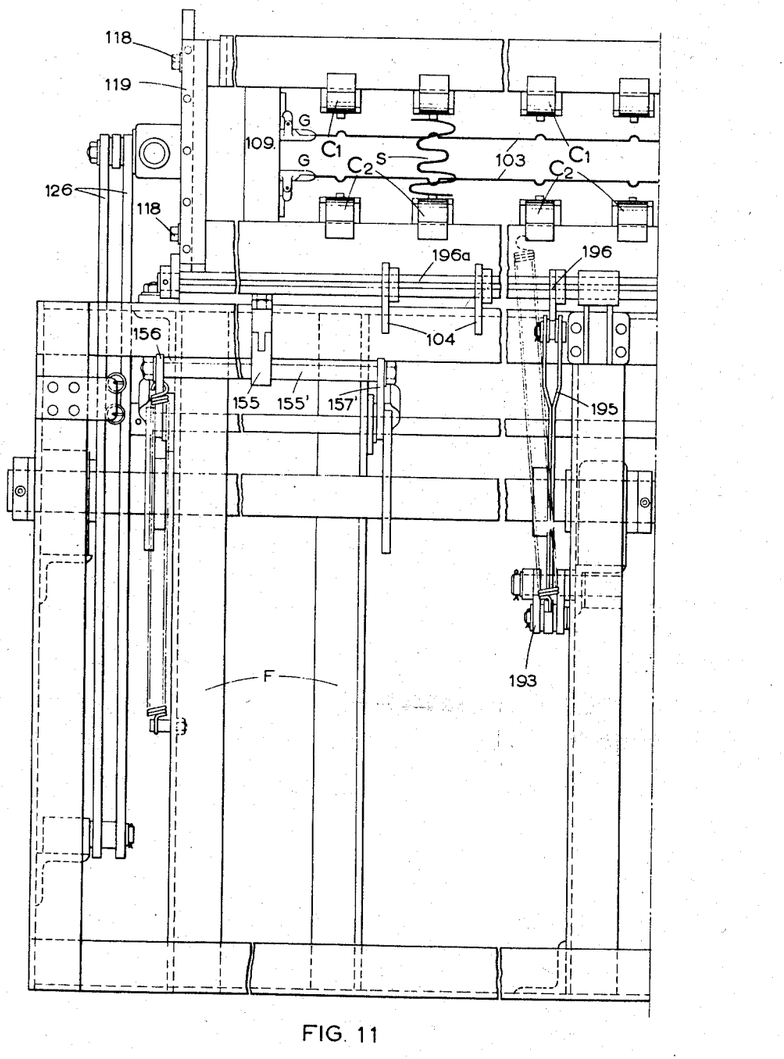
Figures 11 and 11a, when combined, comprise a front elevation of the machine of the said parent patent.

Thus, when commencing the production of a spring assembly the following operations arise:

(1) Fit the leading row of springs in the spring receiving parts of the machine to where the tie wire have to be fed into position for imparting movement about their axes to link up to the leading row of springs the next row of springs. Such parts of the machine are scissor action platforms hereinafter described, but in Figure 11 are indicated diagrammatically at C¹ for the upper end convolutions of the spring and at C² for the lower end convolutions, one spring being shown at S located between one pair of these platforms.

Figure 11A:
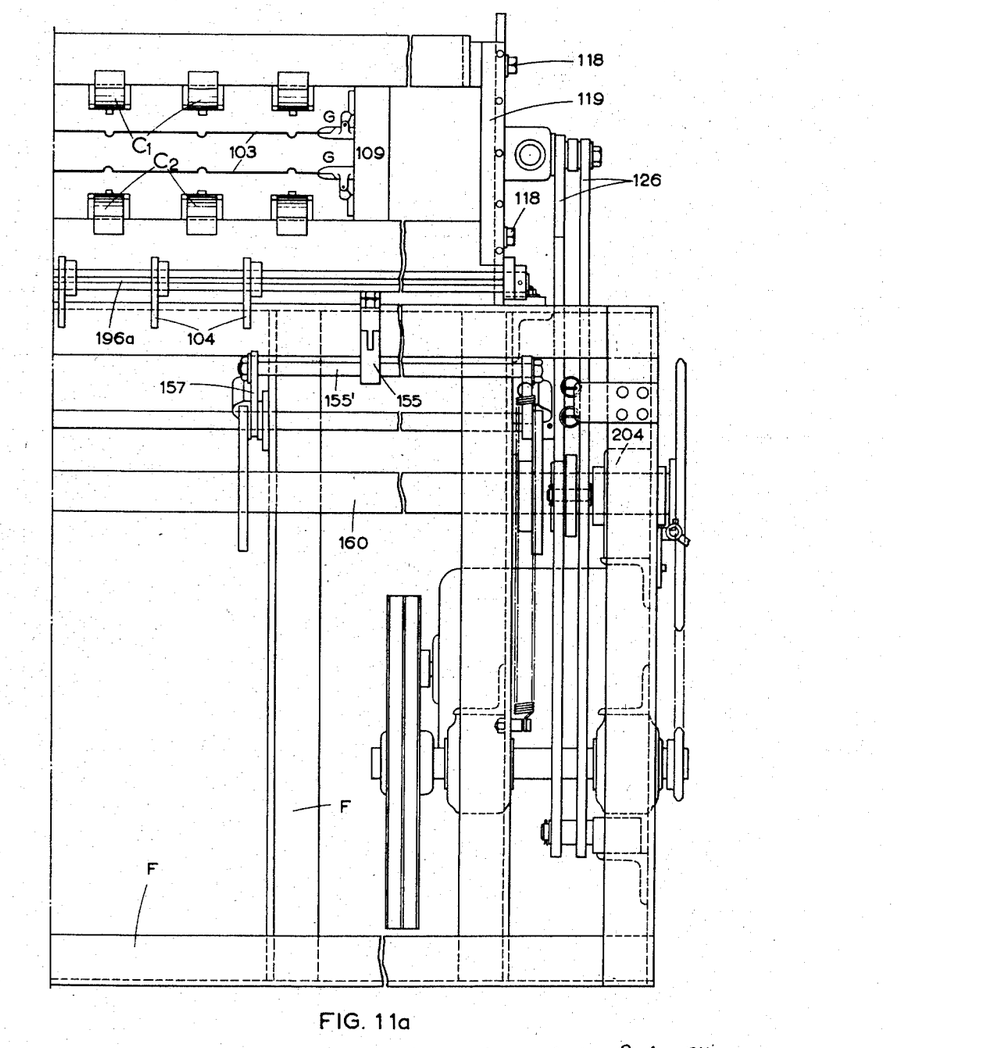

(2) Feed two spaced parallel tie wires in a holder 104 (see Figure 17) up to the leading row of springs so that they are received in grippers G (see Figures 11 and 11a) and lie slightly inside the radius of end convolutions of the springs already assembled in the machine with one tie wire 3 slightly beneath the upper convolutions of the springs and the other slightly above the lower convolutions of the springs.

(3) Deform the first row of springs to bring their end convolutions close to the tie wires.

(4) Grip the ends of both tie wires in the grippers G.

(5) Impart a partial rotation symmetrically to the two grippers G so to position the S-shaped projections of the tie wires that following the next row of springs having been offered up to the leading row of springs and said two tie wires now positioned as described at (2) above, that subsequent partial rotation of the tie wires in the same direction and then through a greater angle in the reverse direction will hook the S-shaped projections 2 of the tire wires into inter-engagement with the spring ends.

(6) Following the first partial rotation of the tie wires described in (5), offer up the said next row of springs to the first row with the leading parts 1x (see Figure 10) of the end convolutions of the springs of the said next row engaging over and underneath the rear parts of the upper and lower convolutions respectively of the first row and also deforming the end convolutions of the said next row of springs so that the planes of the end convolutions of one row intersect the planes of the end convolutions of the other row.

(7) Displace slightly rearwardly against stops the first row of springs to ensure that they are located firmly with their end convolutions contacting those of the second row.

(8) Impart to the tie wires the second described partial rotation mentioned in (5) to so position the S-shaped projections of the tie wires with the first row of springs that upon effecting the said reverse movement of paragraph (5) through a greater angle of the tie wires the said projections will upon rearward traction of the rows of springs complete their interengagement with the two rows of springs.

(9) Effect the latter mentioned reverse rotation of the tie wires, then clinch the tie wires to the springs.

(10) Drag forwards the first row of springs so that they draw with them the second row to the position originally occupied by the first row ready to re-commence the cycle of operations to bring in the third row of springs and so on.

(11) Move the tie wire holder 104 back to its normal rest position ready for reloading with two further tie wires.

Now referring to Figures 11 to 15 inclusive, which show details of the machine of Patent No. 2,835,281, the holder in which the two tie wires are located consists of a series of identical arms 104, hereinafter referred to as the tie wire holder, with transverse parts 105 having V recesses 105a having notches 105b in which the straight parts of the two tie wires are pushed. The holder 104 is carried by arms 196 pivoted on a rod 196a and rocked by a cam actuated lever 193 via a link 195. The tie wires may be held frictionally in position until they are engaged and gripped by two pairs of rotary grippers indicated generally at G in Figures 11 and 11a, where it will be seen that the grippers are carried by two rectilinear housings 109 (see Figures 12, 14 and 15) secured to upper and lower horizontal bars 110 and 110a, respectively, fixed to the machine frame F each by a base plate 111 with an angle back stop 111a and a clamping bolt 112 threaded through a lug 113 integral with the base 111. These grippers are located with their horizontal axes of rotation about five-eighths of an inch inside the horizontal planes occupied by the upper and lower convolutions of the aforesaid first row of springs when positioned in the machine ready to receive the next row of springs, and in Figures 11 and 11a there is indicated generally at C¹ and C² the upper and lower lines respectively of spring locators which also act as spring compressors and in between which the row of springs in the machine are (1) held under slight compression, (2) canted so that their end convolutions are brought out of the parallel so as to lie in planes converging towards a position in front of the machine, and (3) dragged rearwardly by relatively slidable draw bars in the units C and C' to effect a progressive build up of springs and tie wires into the desired length of spring assembly.

These spring compressor feeder units C and C' are more clearly shown in their preferred form in Figures 4 to 7 and for each spring there is provided an opposed symmetrically arranged pair of units, a lower one only being shown, it being understood that the cooperating upper unit is upside down with respect to the lower unit. Each unit is secured by bolts and wing nuts 115 and clamps 116 (see Figure 12) to an associated pair of beams 117 (see Figures 11 and 12) secured by studs 118 to end brackets 119 of the upper part of the machine frame F.

Actuating bars 1 for the units C, C' are secured at their rear ends by clamps 1' to a pair of horizontal cross rods 122 common to a complete line of the compressors C¹, C² these two rods being carried by cross heads 123 (see Figure 12) of rods 124 reciprocating in guides 125 on the end brackets 119 and actuated by a lever 126 fulcrumed to a foot bracket 127, a link 126a taking care of the arc of movement of the upper end of the lever. The mechanism which clinches the tie wires to the springs and draws each row of springs rearwards to build up a mattress spring assembly is operated by the draw bars 1 in a manner hereinafter explained.

It will be seen that the spring end convolution rests upon the upper inclined faces of platforms 17 or 58 hereinafter described and this cants the spring so that instead of the planes of the two end convolutions being parallel, i.e. normal to the axis of the spring, they converge forwardly and this causes each of them to abut against the straight part of the adjacent one of the two tie wires which, prior to the return of the draw bar 1, have been positioned by the tie wire holder 104 so that the vertical dimension between the two tie wires is less than the distance between the end convolutions of the spring when abutting under slight compression in horizontal planes against the aforesaid units C and C' after the units have been fully retracted by the rearward swing of the lever 126.

The next row of furniture springs to be coupled up to the row which now engages the platforms are offered up by hand and the end convolutions of the new line of springs are, as hereinafter explained, tripped over loading hooks associated with the platforms 58. If desired the row of springs to be offered up may be fitted under slight compression between spacers in a tray 142 indicated in broken lines in Figure 12 and operated either by hand or from a cam shaft 160 of the machine which actuates the lever 126. With such a tray the spring ends would project for about half of their diameters beyond the tray.

Figure 12:
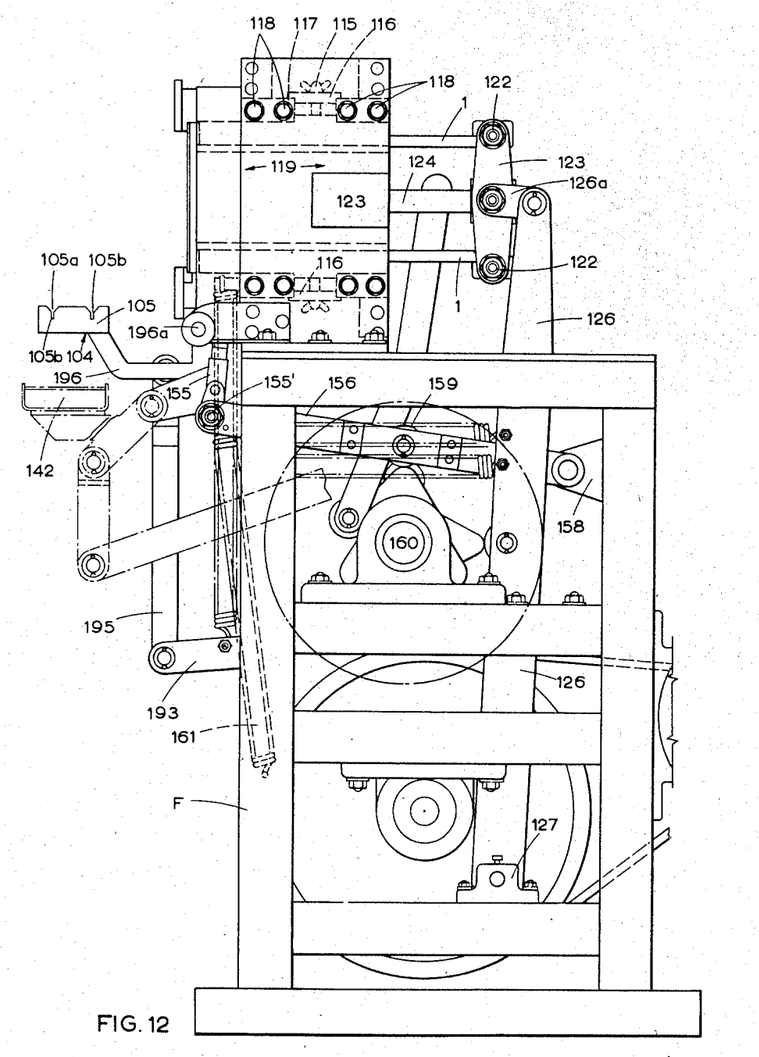
Figure 12 is a side elevation view of such machine.
Figure 13:
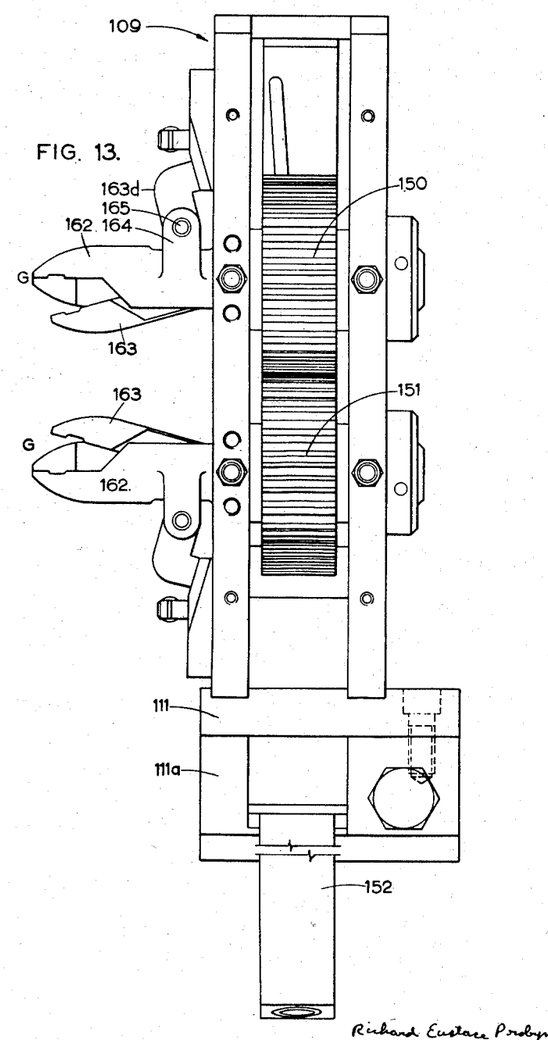
Figure 13 is a front elevation view of one end pair of grippers for the tie wire.
Figure 14:
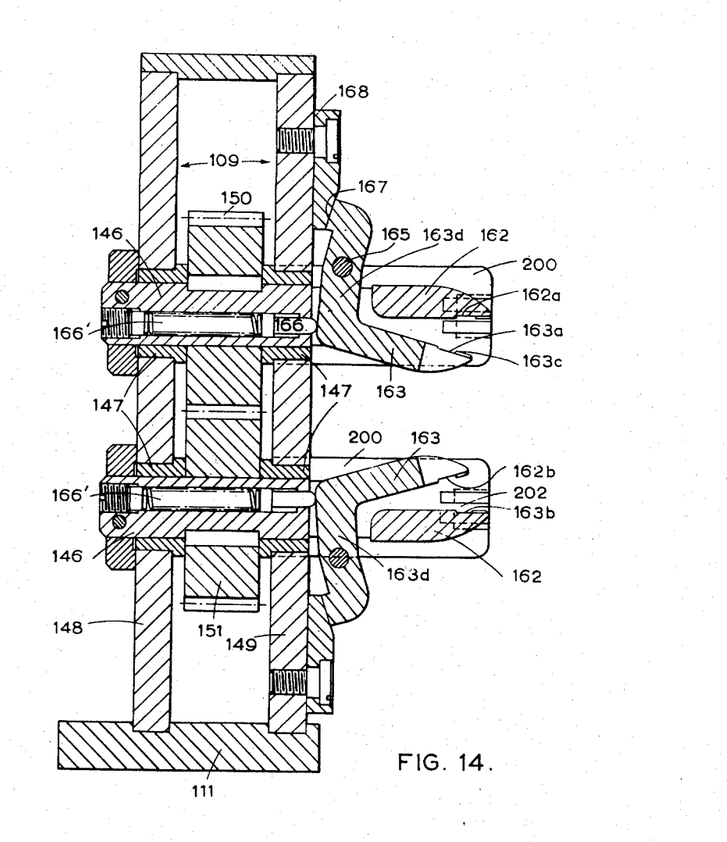
Figure 14 is a sectional view of the other pair of rotary grippers.
Figure 15:
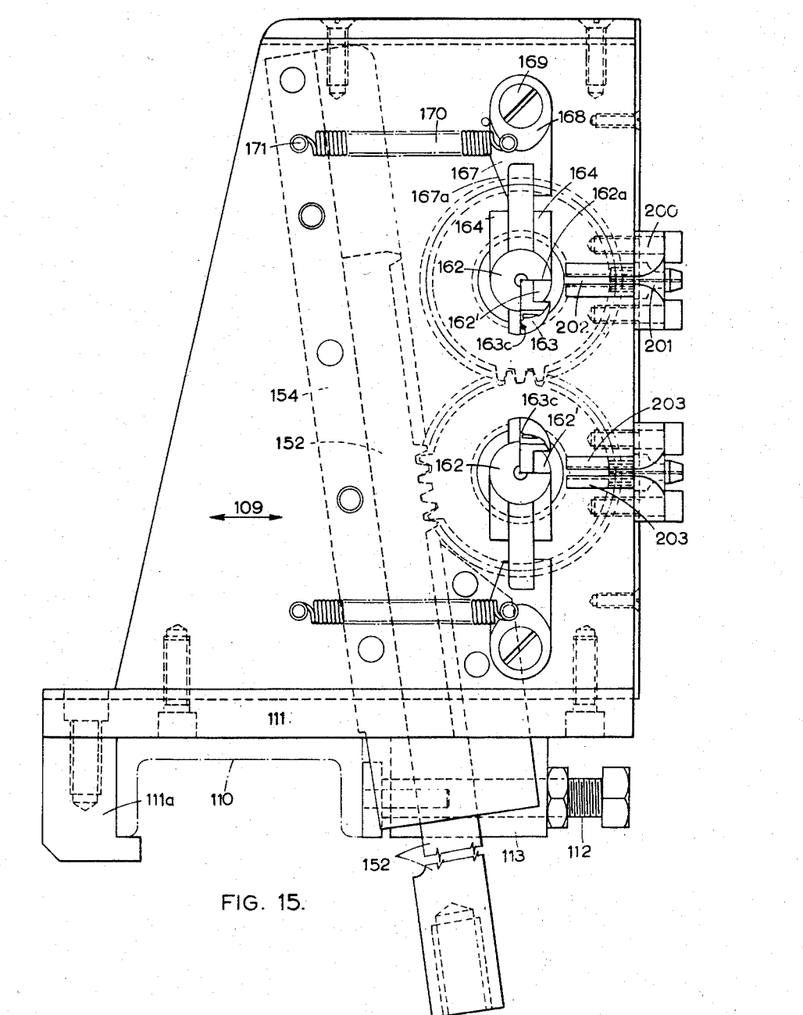
Figure 15 is a side elevation view of Figure 13.

The two pairs of tie wire grippers G are shown in Figures 13, 14 and 15. Each gripper is carried by a spindle 146 rotating in bushes 147 in side plates 148 and 149 of the housing 109, the spindles being keyed in identical meshing gear wheels 150 and 151 so that the two spindles rotate simultaneously in opposite directions, oscillatory rotation being imparted thereto by a reciprocating rack bar 152 meshing with the lower gear wheel 153 and sliding along an inclined guide 154 secured between the side plates 148 and 149 and passing with the rack bar through an opening in the base member 110, each rack bar being connected by a link 155 (see Figure 12) to a horizontal rod 155' carried across a pair of parallel arms 56 and 57 pivoted at their rear ends to lugs 158 (see Figure 12) on the rear of the machine frame and each carrying a roller 159 maintained pressed into engagement with the appropriate one of a pair of identical cams (hereinafter described) on the cam shafts 160; consequently there are a pair of cams and a pair of arms 156, 157 for each pair of tie wire grippers. Coiled tension springs 161 maintain the rollers 159 of these arms in engagement with the appropriate cams.

In Figures 13, 14 and 15, the tie wire grippers are shown in the open position ready to receive the ends of the two tie wires which are cranked as at 103b at their ends to afford limbs by which the ends of the wires may be held firmly in the grippers. Each gripper comprises a jaw 162 fixed in relation to the spindle 146 and a pivoted jaw 163. The jaw 162 is of three-quarter circular cross-section as more clearly shown in Figure 15 into the quarter circular section segmental recess 162' of which is moved the quarter circular segmental cross-section jaw 163, the tie wire being gripped between the radial face 162a of the jaw 162 and the opposed face 163a of the jaw 163 these wire gripping faces being formed with recesses 162b and 163b respectively in which is received the cranked end of the tie wire, the adjacent end part of the tie wire lying along a groove 163c of the jaw 163 and held by the pressure of the jaw 163 against the jaw 162 along the axis of rotation of the spindle 146. The jaw 162 has parallel side lugs 164 between which is located a cranked part 163d of the jaw 163 pivoted by a pin 165 passing through said lugs.

A plunger 166 loaded by a spring 166' engages the inner end of the jaw 163 to press it about the pivot pin 165 against the jaw 162 when a tie wire is held between the jaws, and when the tie wire is to be released or to be fed in between the jaws, the jaw 163 is opened by the outer end of its cranked part 163d riding over a cam surface 167 of a cam block 168 pivoted to the stem of a screw 169 threaded into the side wall 149 of the housing 109. A tension spring 170 is connected to each cam member 168 and to a pin 171 in the housing 109, and the cam 167 has an inclined edge 167a along which the free end of the cranked part 163d rides when it moves towards and engages such inclined edge so that a spring pawl action obtains by reason of the end of the jaw part 163d pushing the cam about the pin 169 against the influence of the spring 170. That is to say when this action occurs the jaw part 163d does not ride over the crested surface of the cam but simply trips past the cam. On the reverse rotary movement of the gripper the cam block is immovable and the jaw part 163d rides up on to the crest of the cam to occupy the position shown in Figure 14. The holder 104 carries the tie wires past the axis of rotation of the grippers to ensure that the cranked ends of the tie wires enter properly between the gripper jaws. The holder then moves back about 10° to the correct position of the tie wires relatively to the springs. When the tie wires are positioned in the jaws the holder 104 remains stationary while the gripper jaws close, this closing being due to the spindles 146 being rotated by the upward movement of the rack bar 152 an amount sufficient to turn the grippers approximately 30°. It can be during the first half of this movement, i.e. before the jaws are fully closed, that the tie wire holder is moved back about 10° from the grippers. Following this the grippers move approximately a further 30°. The next movement of the grippers is in the reverse direction through about 170° to the position due to a return stroke of the rack bar 152 and it is during this movement that the cam 168 is displaced idly by the jaw part 163d to ensure the jaws remaining closed. The final movement in the cycle of operations which moves the tie wire about its axis is back to the position at which the jaws open ready to re-commence the cycle of operations.

During these arcuate movements of the tie wire about its axis its hook-like projections are interengaged with the end convolutions of the two rows of springs so as to bring the part 102a (see Figure 10) of each projection over the part 101x of the appropriate spring of the newly arrived row of springs and the part 102b under the part 101a of the row of springs at the trailing end of the already assembled line of springs extending to a table (not shown).

It will be appreciated that these cooperating movements of the tie wire grippers and the holder 104 also require making certain that the cranked ends 103b of the wires are offered up to the open jaws of the grippers in planes passing between the open jaws and with their free ends trailing so as to bring the tie wire axes in the axes of rotation of the grippers. For this purpose the cranked ends 103b project from each tie wire approximately in the direction of the S-shaped hooks so that when the tie axes are located in the V-shaped notches of the holder 104, the wires will, by gravitational influence, set themselves with the hooks and cranked ends pointing downwards. However, it is preferred to assist this movement by providing permanent magnets with the holder 104 at positions where their influence will pull down the S-shaped parts. To make certain that the tie wires are guided properly to the grippers there is provided alongside each gripper a forwardly projecting bar 200 with a flared mouth 201 merging into a slot 202 radial with respect to the axis of rotation of the associated gripper and constituted by the gap between two parallel bars 203 projecting from the bar 200 and with their free ends close to but not contacting the gripper. The cranked ends of the tie wires are guided into the flared mouths 201 along the slots 202 into the open grippers.

Figure 1:
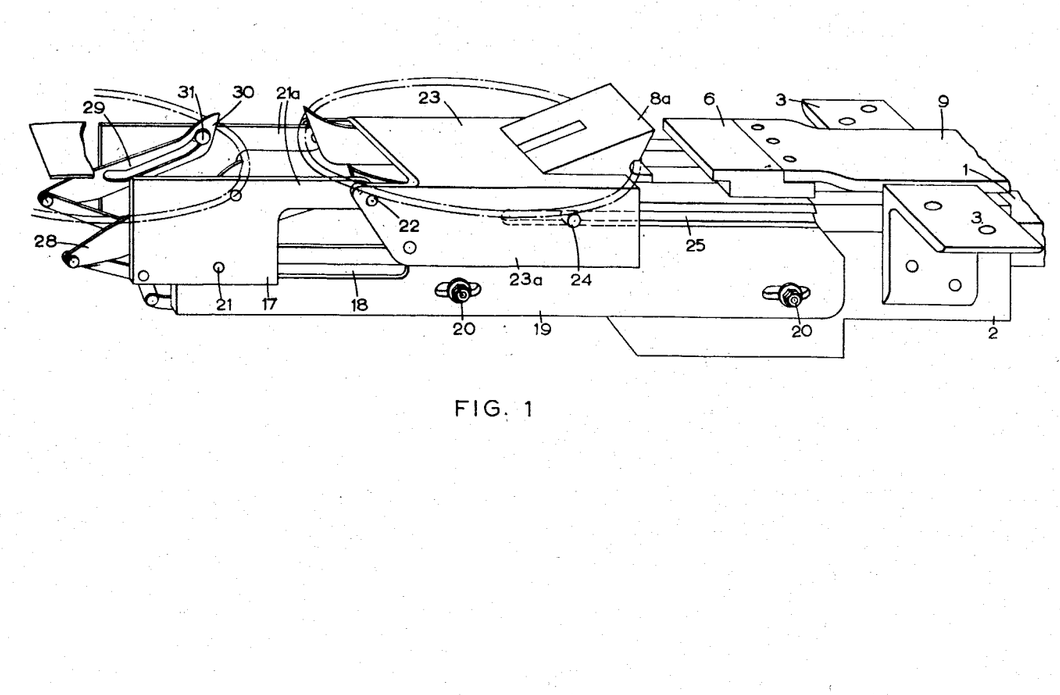
Figure 1 is a perspective view of one such mechanism.
Figure 2:
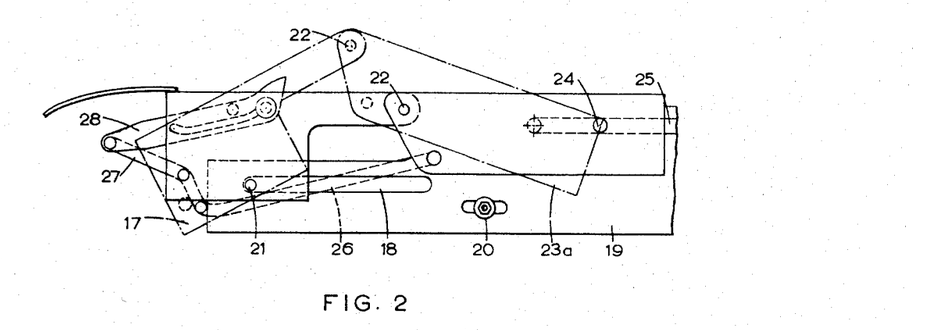
Figure 2 is a side elevation view with parts of Figure 1 omitted.
Figure 3:
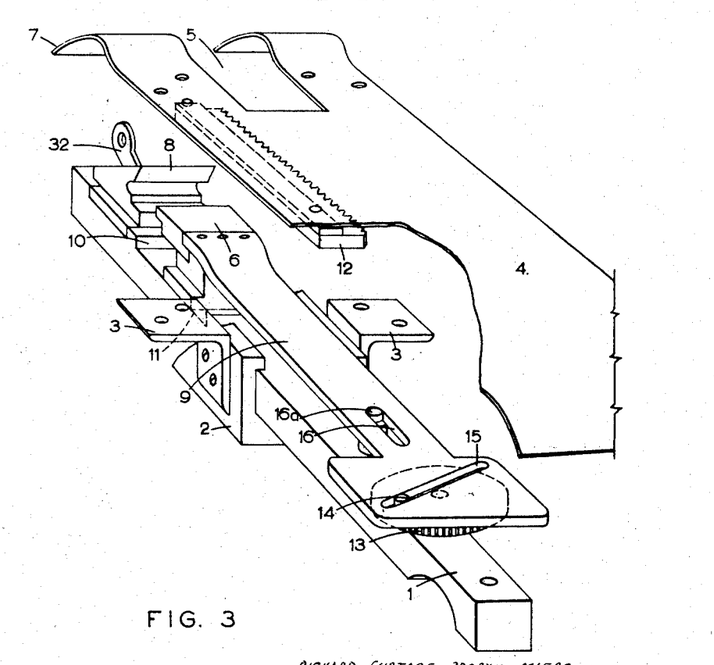
Figure 3 is an exploded perspective view showing the right hand end of the fixed guide of Figure 1, the actuating bar slidable therein, and a top plate of the mechanism.

Referring to Figures 1 to 3 of the drawings, it should be understood that the mechanism shown is duplicated in obverse for each spring and that there is a number of such pairs of mechanisms corresponding to the number of springs in a single transverse row of springs of the spring assembly being produced. The mechanisms are actuated in unison from a cam, or preferably two identical cams on a shaft 160, adjacent to the ends of the machine and fixed on a cam shaft with which is associated a foot pedal controlled clutch to connect and disconnect the cam shaft to and from a driver as in the parent patent.

Each mechanism has its main actuating bar 1 forming driving means for the apparatus and all of these bars are connected at 1' to the rearwardly disposed anchorage unit 123 actuated by the lever 126, a pair of identical levers being rocked by the said cam or cams to reciprocate the bars 1 each in its associated channelled guide 2 affixed to the machine frame by the side brackets 3. Fixed to these brackets and disposed above the guide 2 is a top plate 4 (see Figure 3) which at its front end is slotted as at 5 to clear a tie wire clinching jaw 6 and is raked to produce a pair of inclined limbs 7 to guide the clinched work on to the top plate 4, the assembled work being drawn along these plates to a table at the rear of the machine by the traction due to the rearward movement of a clinching jaw 8 carried by the front end of the bar 1 and between which and the jaw 6 are clinched the substantially S-shaped tie wire hooks interlaced with the overlapping spring ends. The jaw 6 is carried by the front end of an arm 9 and at its base reciprocates between a pair of stops 10 and 11 comprising the terminals of an undercut in the top face of the bar 1, the arrangement being such that the two jaws are brought together at an intermediate stage in the retraction of the work.

Actuation of the jaw 6 is by means of a rack bar 12 fixed to the under-face of the top plate 4 in a position where it is traversed by a pinion 13 supported for rotation on a fixed axis by the bar 1, this pinion carrying a pin 14 engaging in a cam slot 15 in an enlargement of the rear end of the arm 9, and the arm 9 being slotted as at 16 to receive a guide pin or roller 16a carried by the bar 1. The ratio between the rack bar 12 and the pinion 13 and the location of the pin 14 on the pinion 13 is such that the jaw 6 is held spaced in rear of the jaw 8 as shown in Figure 1 in advance of the forward terminal position of the bar 1 so that the springs can slip easily over the jaw 8 which, as shown, have inclined upper faces 8a for this purpose.

By way of example for the average type of furniture spring, the bar 1 will have a stroke of about 4⅜", and the reciprocating action is not a simple harmonic motion, by reason of the beam which actuates the bars 1 being reciprocated by means of a cam profiled to produce the motion required in the bars 1 to enable idle periods to be obtained for loading the new springs, it being understood that the machine is stopped during loading when the jaw 6 is spaced in rear of the jaw 8. At this stage a pin 21 projecting inwardly from each of a pair of pivoted side arms 17 is at the forward end of a groove or slot 18 in a cam plate 19 secured fixedly in the desired position by bolts 20, it being understood that there is a pin 21 on each side arm 17 and each in a groove or slot 18 in the two side cheeks of the cam plate 19. In the position shown in Figure 1 the bar is arrested about 1" from the end of its full forward stroke, the machine now being ready to receive the new row of springs, whereupon the machine is restarted.

The arms 17 which form a loading platform or spring locating means are linked by relatively narrow rear extensions 21a and a transverse pivot pin 22 to the side limbs 23a of an assembly tray or spring platform forming a spring positioning device 23 on to which the row of springs previously assembled in the machine are placed. The forward end of the bar 1 has a lug 32 connected by a link 32a to the pivot pin 22, and the side limbs 23a carry pins 24 which slide in a groove 25 in the cam plate 19, so that when the bar 1 is pushed forwards beyond the position shown in Figure 1 the tray 23 and arms 17 (forming a spring table) are inclined to the positions shown in broken lines in Figure 2 so that the furniture springs are now deformed. For example, the bases thereof lie in intersecting planes, or in other words the opposed two lines of springs are compressed at their opposed sides whereby the base convolutions of the springs are brought into position ready to receive the previously located tie wire.

The latter mentioned movement, which can be regarded as a scissors movement, also draws the two lines of springs into position so that taking one of these springs a chord of its diameter crosses a chord of the previously assembled spring.

At the latter mentioned stage the rotation of the tie wire to produce interlacing of its hooks with the two springs takes place, the actuating bar 1 pausing at the end of its stroke, and subsequently being moved to the terminal position of its stroke which pulls the spring assembly forward one station and on the reverse motion of the actuating bar 1 the performance is repeated.

The pulling forward of the rearmost line of springs to a position where it is held ready for receiving the tie wire is obtained through the medium of the linkage comprising the elements 26, 27 and 28, the latter mentioned linkage 28 having a cam groove 29 to guide the loading hooks 30 comprising the rear part of such link to the loading position, the cam slot 29 receiving a pin 31 fixed to the appropriate plate 17, it being understood that the linkage is duplicated.

Referring now to Figures 4 to 7f it should be mentioned that the mechanism about to be described is the one selected for showing as incorporated in the machine shown in Figure 12. Parts of the mechanism shown in Figures 4 to 7f have where appropriate been given the same reference numerals as in Figures 1, 2 and 3. It will be seen that the spring end convolutions rest upon platforms 58 hereinafter described and that the main actuating bar 1 slides in the guide 2 as previously, but that the guide 2 is designed for mounting in the apparatus by means of a different type of bracket 3'. The top plate 4 is again secured to the guide 2 by means of a pair of angle brackets 3. As in the previous embodiment, only one clinching mechanism is illustrated and it will be appreciated that there is an identical mechanism for each spring of the row and furthermore that the upper ends of the springs are all engaged with similar but reversed mechanisms. The end of the main bar 1 is, in this embodiment, provided with a D-shaped retainer member 1' which is secured to the operating shaft of the machine.

As in the previous embodiment the top plate 4, is provided with a slot 5 to afford clearance for one of the two clinching jaws, such clinching jaw 6 being carried by the end of the arm 9 and the portions 7 of the top plate 4 adjacent to the slot 5 being inclined to provide a pair of inclined limbs. A pair of cam plates 19 are secured by bolts 20 to the sides of the guide 2 and the bolts 20 pass through elongated slots in the cam plate in order to afford a measure of adjustment for the cam plates relatively to the guide 2.

It will be clear from what has gone before that it is necessary to provide for relative movement between the clinching jaw 6 and the bar 1 at the different stages in the operation of the mechanism. In order to afford this relative movement, in this embodiment of the invention the rear portion of the bar 1 is provided with a block 40 (see Figure 6) to which are secured a pair of toggle links 41 by means of two toggle link pins 42. At its other end, each toggle link 41 carries a roller 43, each such roller moving freely about the appropriate one of a pair of roller pins 44 which serve to connect the toggle links 41 to a further pair of toggle links 45; the two further toggle links 45 are connected by pins 46 to a triangular plate 47 rigidly secured to the rear end of the arm 9. The main bar 1 continues underneath the toggle link assembly 41 to 47 and extends to the forward part of the mechanism as will be hereinafter apparent.

In order to provide for the aforesaid relative movement between the bar 1 and arm 9, the rollers 43 move over the cam surfaces of a pair of swinging cams 49. These swinging cams are pivoted to the underside of the top plate by means of pivot pins 50 and also at their forward parts carry upstanding pins 51 which move in curved slots 52 (see Figure 5) in the upper surface of the top plate 4. In order to provide for the necessary pivoting movement of the swinging cams 49, a part of each cam to the rear of the pivot pins 50 is engaged by a spring urged pivoting lever 53 which is also mounted on the underside of the top plate by means of a pin 54 and is urged into engagement with its swinging cam 49 by means of a tension spring 55. In the position shown in Figure 5, the bar 1 has reached its maximum forward position and the rollers 43 are clear of the ends of the swinging cams 49. Rearward movement of the bar 1 will cause the rollers to move over the inner surfaces of the cams 49 and, since the separation between the pins 50 is small compared with the separation between the rollers 43 in the position shown in Figure 5, the toggle link assembly will be squeezed into the position shown in Figure 6 with the result that, in spite of the fact that the bar 1 has moved rearwardly, the arm 9 will remain substantially stationary. Thereafter as the bar 1 moves to its rearward position the rollers 43 will clear the rear ends of the cams 49 with the result that the springs 55 will be able to reassert themselves and move the cams 49 from the position shown in Figure 6 to that shown in Figure 5. Thereafter on forward movement of the bar 1, the rollers 43 will travel over the outside of the cams 49, displacing the levers 53 until they reach the position shown in Figure 5. Thus in a complete cycle of operation the rollers 43 move around the entire surface of the cams 49.

Figure 7A:
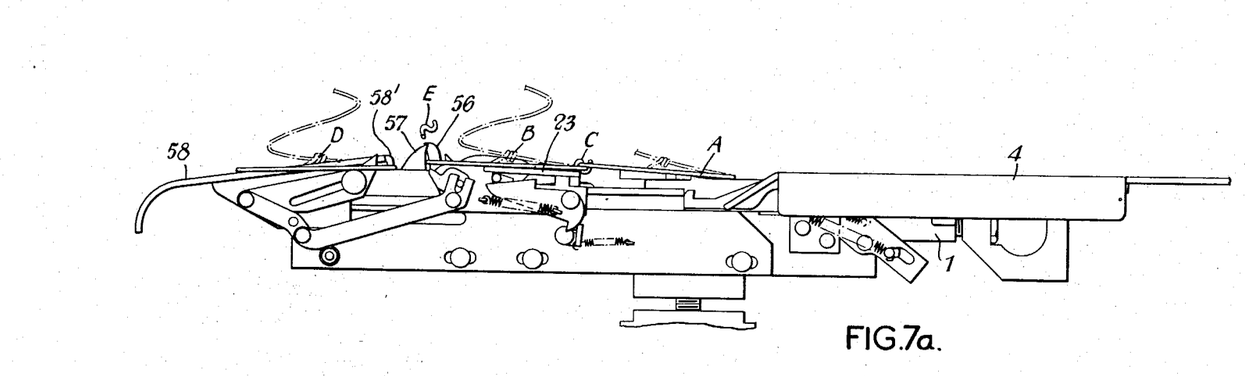
Figures 7a to 7f are side elevations showing the mechanism in the six stages of a cycle.

Turning now to the Figures 7a to 7f which illustrate the entire cycle of operations following the platforms 58 having received their springs, Figure 7a illustrates the parts in the loading position. In this position a spring A which is part of the spring assembly is shown resting upon the upper surface of the arm 9 at its rearward part and the spring A is connected to a spring B by means of a tie wire C, this tie wire having been rotated by the grippers G in the manner described in the parent patent but not as yet having been clinched to the springs. Further springs, not shown, may be assumed to extend to the rearward from the spring A, being supported on the top plate 4. The front edge of the spring B is held firmly in a pair of claws 56, 57 and a further spring D has just been loaded on to a loading platform 58 with its rearward edge engaged over the edge 58' of this loading platform. A new tie wire E is shown in position above the claws 56, 57 and is held in the grippers G. It will be appreciated that the springs A, B and D are under slight compression.

Figure 7B:
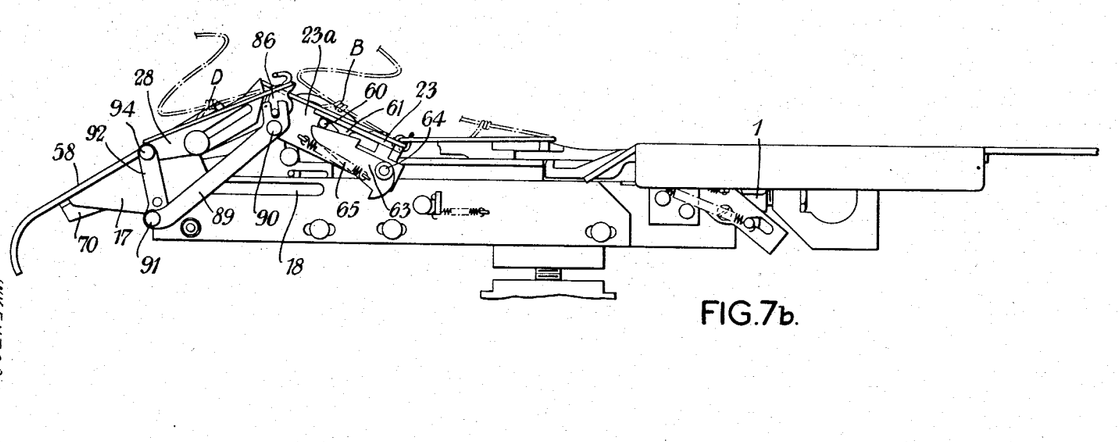

The main actuating bar 1 now moves to the left looking at the figure from the position shown in Figure 7a to the position shown in Figure 7b and reaches its maximum forward position and at the same time, causes the spring table, i.e. the loading platform 58 supporting the spring D and a spring platform 23 supporting the spring B, to break and tilt the springs B and D at the same time moving them into their relationship in which the spring ends slightly overlap each other ready for the engagement by the tie wire E. This breaking of the spring table is afforded by the connection between the forward end of the main bar 1 with the spring table by means of a link mechanism connecting the bar 1 with a plate 67 located below the platform 23, this plate 67 carrying a pair of pins 60 which extend outwardly from the platform and each of which rides in a slot 61 in a spring platform side plate 23a under the control of a catch 63 which is pivoted at 64 to the platform side plate 23a and is controlled by a spring 65. In the position shown the pin 60 is at the forward end of the slot 61.

The upper surface of the spring platform 23 carries a pair of curved arms 66 which pass over the forward edge of the plate 67 and this forward edge of the plate 67 also carries a pair of upturned hooks 68 for engagement with the spring B. An extension 69 on the front end of the main bar 1 is connected to a sector plate 70 which is able to slide in guides 71 on the underside of the loading platform 58. This loading platform 58 has a pair of triangular side cheeks 17 each of which carries a pin 21 slidable in a slot 18 in the cam plate 19 and the rearward end of the loading platform 58 is connected to the forward end of the spring platform 23 by means of a pair of pivot pins 22 passing through the side plates 23a (see Figure 5), so that when the pin 21 has reached the further forward end of the slot 18 and at the same time the pin 60 has reached the forward edge of the slot 61, further forward movement of the main actuating bar 1 causes the above described breaking of the spring table 58, 23.

When the spring table breaks the spring B is prevented from moving rearwards by the hooks 68 on the plate 67 and at the same time a pair of catches 86 swing into position to prevent the spring from moving forwards. These catches 86 are each pivoted to the respective side plate 23a and carry a pin 87 engaged in the forked end 88 of a lever 89 pivoted to the side plate 23a by a pivot pin 90. The other end of the lever 89 is pivoted by a pin 91 to a short lever 92 pivoted at 93 to the side cheeks 17.

The other end of the short lever 92 is connected by a pivot pin 94 to a sliding lug lever 28 whose path of movement is controlled by a fixed stud 31 on the side cheek 17 movable in a slot 29 in the lever 28. The rear end of the lug lever 28 has a nose 28' which picks up the spring D when the spring table breaks.

Now with the springs B and D in the position shown in Figure 7b, there is a dwell in the operating mechanism in order to enable the tie wire E to be rotated by the grippers G partially to engage itself with the spring D.

Figure 7C:
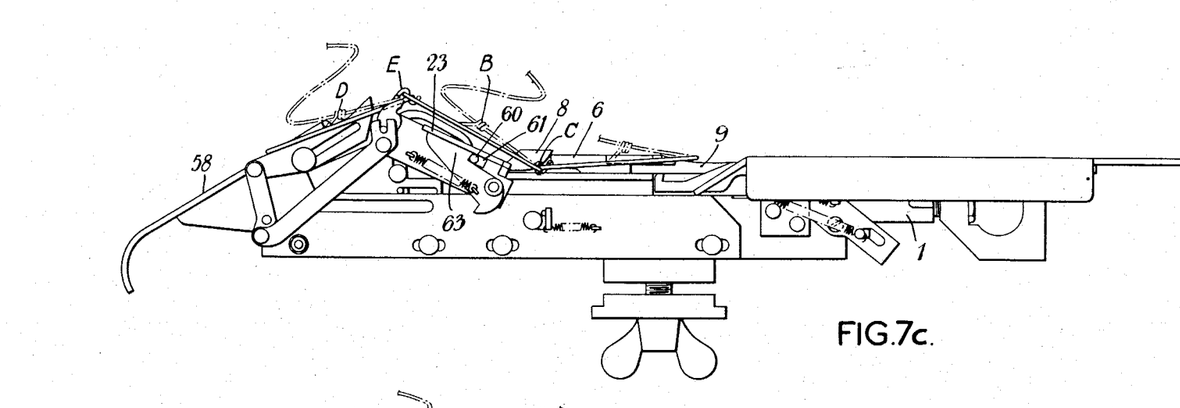

The main actuating bar now moves rearwardly (to the right) to the position shown in Figure 7c and the clinching jaw 8, which is rigidly carried thereby, engages inside the spring B and draws it and the remainder of the spring assembly rearwardly of the machine so that the tie wire C begins to be pinched between the clinching jaw 8 and the clinching jaw 6 carried by the arm 9. However, the spring D remains in its original position and thus the gap between the springs B and D is closed in order to permit the continued rotation of the tie wire E to effect the locking of these two springs together. This rearward movement of the main bar 1 causes the pin 60 to move to the rearward end of the slot 61 behind the catch 63 thus leaving the table 58, 23 in the broken position.

Figures 4, 6:
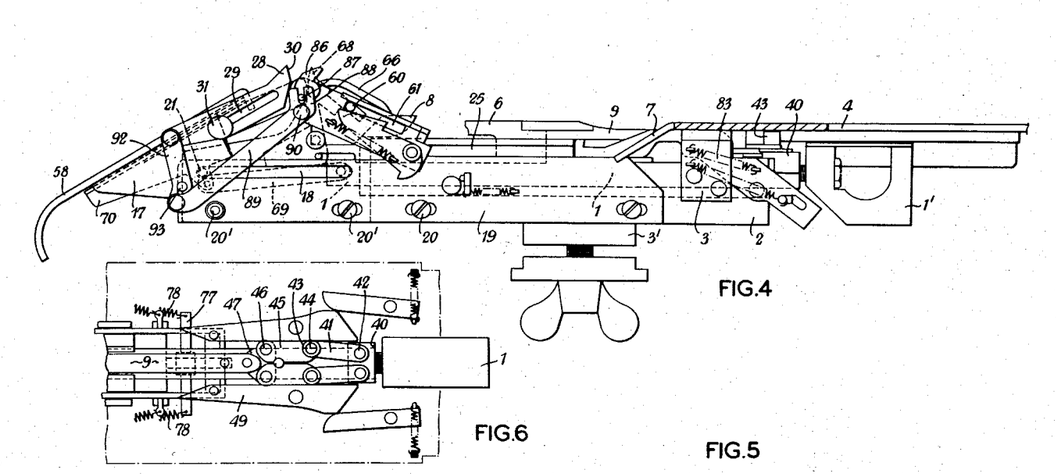
Figure 4 is a side elevation of the second embodiment showing the spring table in the "broken" position.
Figure 6 is a part plan view showing the right-hand portion of Figure 5 at a different stage in the cycle.
Figure 5:
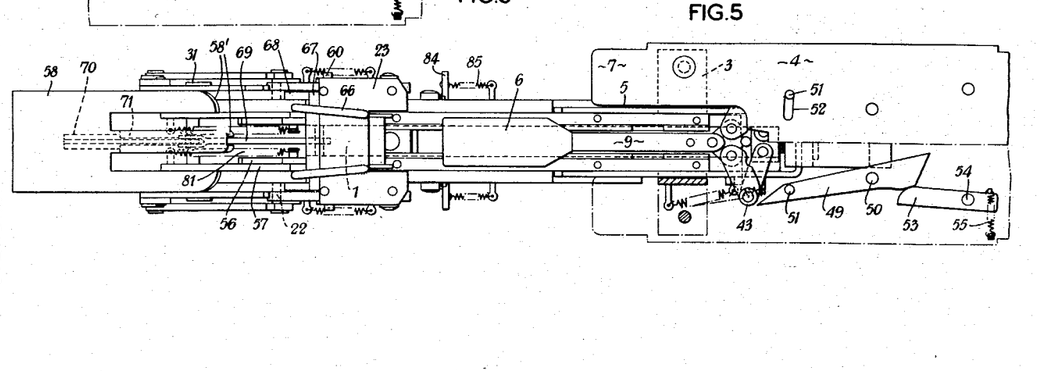
Figure 5 is a plan view corresponding to Figure 4, with parts in section.
Figure 7D:
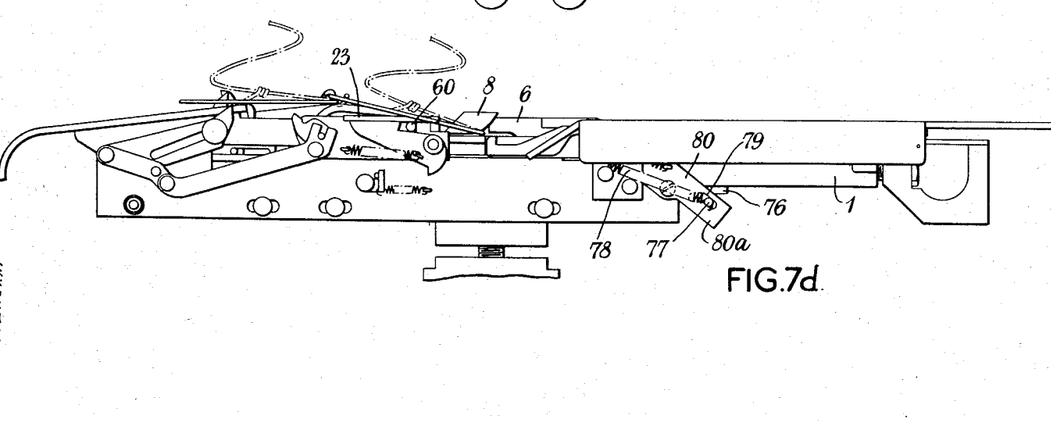

The main bar 1 continues to move rearwardly and the parts now go into the position shown in Figure 7d. In this position, the toggle link assembly is as shown in Figure 6. During the movement to the Figure 7d position, the tie wire C (no longer shown) is firmly clenched between the clinching jaws 6 and 8 and the pin 60 draws the spring platform 23 to the right so causing the two spring tables to come back into the substantially aligned position.

The underside of the main bar 1 is provided with a raised cam surface 76 and, as will be seen from Figure 7d, during the rearward movement of the main bar 1 this raised cam surface 76 displaces a transverse pin 77 which is loaded by a spring 78 to the rearward end of an angled slot 79 in the rear part 80a of an ejection lever 80.

Figure 7E:
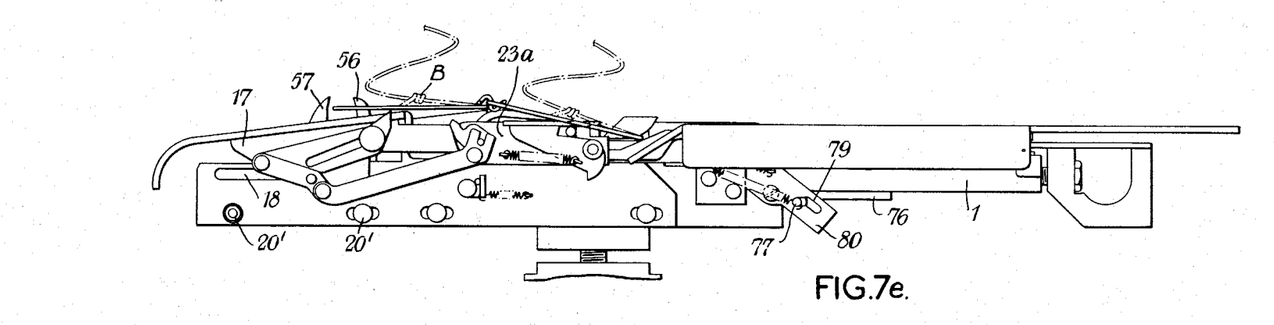

The main bar 1 continues to move rearwardly to reach the position shown in Figure 7e which is the maximum rearward movement of the bar and the pin 77 drops over the front edge of the cam 76 and so returns to the forward edge of the slot 79 in the ejection arm 80. At the same time, claws 56 which are connected by springs 81 to the guide 2 (through the claws 57, bolts 20' and cam plates 19) are picked up by abutments on the inner side of the triangular side cheeks 17 and are moved rearwardly to the open position as shown in Figure 7e. The pins 21 on the side cheeks 17 slide rearwardly in the slots 18 whilst similar pins in the platform side plates 23a slide rearwardly in the slots 25 in the cam plate 19.

The opening of the claws 56 and 57 permits the free edge of the spring B to drop into the gap between these two claws. At this stage the next tie wires (not shown) are loaded into the machine.

Figure 7F:
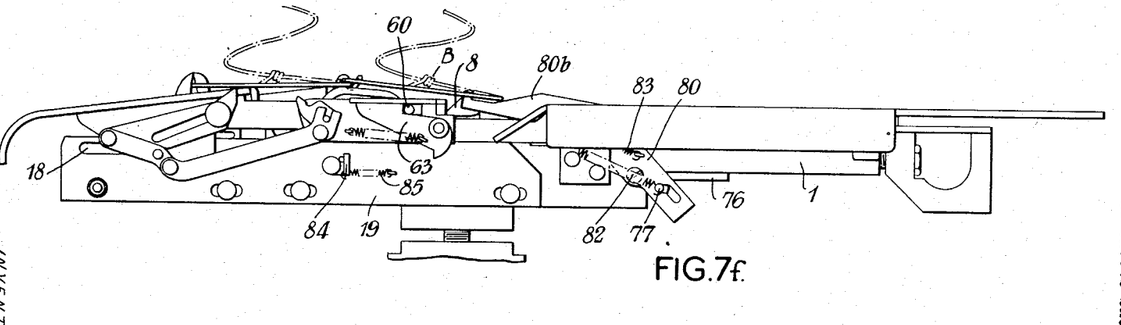

The main bar 1 now moves forwardly to the position shown in Figure 7f, and the pin 77 riding over the cam 76 causes the ejection lever 80 to pivot about a pivot screw 82 against the influence of a spring 83, the front end 80b of the lever rising as shown.

Since the rollers 43 have moved around the outside of the swinging cams 49, the clinching jaw 6 is retracted relatively to the clinching jaw 8 and, since the ejection lever 80 has been tilted as above described, the clinched tie wire C connecting the spring B to the spring A (not shown) is lifted clear to enable the clinching jaw 6 to move underneath this tie wire C to the position shown in Figure 7a as the main bar moves further forwardly. Thus a cycle is completed.

However in going from the position shown in Figure 7f to that shown in Figure 7a to reinitiate the cycle, it will be observed that the pin 60 is released by the catch 63 and this is achieved by a swinging lug 84 pivoted to the cam plate 19 under the control of a spring 85, this swinging lug 84 moving to the inoperative position as the parts go from the position shown in Figure 7c to that shown in Figure 7d. Moreover, the forward movement of the bar 1 causes the pin 21 to move to the left hand end of the slot 18.

I claim:

1. In a machine for assembling furniture spring assemblies in the form of a number of parallel rows of furniture springs coupled together by tie wires parallel with and alternating with the springs and each formed with a number of sinuous hook-like parts projecting laterally therefrom and each with bends receiving each a distinctive spring end for interlacing with the spring ends, such machine comprising means to feed the tie wires in pairs to a predetermined position, gripper means for the tie wires positioned to receive the ends of two tie wires when so positioned, and means imparting turning to the said gripper means about the axis of the tie wires: clinching mechanism comprising first and second clinching jaws mounted on the machine, main driving means effecting reciprocation of the said jaws, lost motion driving means causing reciprocation of the jaws relative to one another, said main driving means causing said first clinching jaw to engage a linked assembly comprising two furniture springs and an interengaged tie wire and to drawing such assembly away from said predetermined position to a clinching position, and said lost motion driving means causing said second clinching jaw to engage said linked assembly at said clinching position to effect clinching and then causing said clinching jaws to separate to permit removal of the clinched assembly.

2. A clinching machine for clinching tie wires to successive parallel rows of furniture springs and in which each tie wire has a number of equidistantly spaced preformed sinuous hooks interlaced with the spring ends to be clinched by the machine to the spring ends comprising a first set of clinching mechanisms arranged side-by-side and a second set of mechanisms arranged above and reversed with respect to said first set, each such clinching mechanism comprising a guide mounted in said machine, a driver reciprocable endwise in said guide, a first clinching jaw mounted on such driver, a spring positioning device pivotally connected at one end to one end of the driver, a spring locating means pivotally connected at one end to the other end of said spring positioning device, a pivotal connection between the other end of said spring locating means and said guide, means to impart a scissor action to said spring locating means and positioning device to deform the springs supported thereby to bring the end convolutions of the springs into intersecting planes to receive a tie wire, lost motion means included in the connection of said driver to said guide via said spring positioning device and said spring locating means, a second clinching jaw and a lost motion driving connection between said second clinching jaw and said driver.

3. A machine for assembling furniture spring assemblies each of which assemblies comprises a number of parallel rows of furniture springs coupled together by tie wires parallel with and alternating with the springs and each formed with a number of sinuous hook-like parts projecting laterally therefrom and interlaced with overlapping end convolutions of a successive pair of the springs, such machine comprising a row of pairs of spring positioning devices between each pair of which a spring is gripped, means to feed the lines of tie wires in pairs in succession towards the row of springs held in said positioning devices so as to locate the tie wires across the insides of the end convolutions of said springs with their preformed hook-like parts positioned for interlacing with the end convolutions of the springs, gripper means for the tie wires positioned to receive the ends of the two tie wires when so positioned, means to locate a further row of springs alongside the aforesaid row of springs and to bring the planes of the top convolutions of each pair of springs to be tied together into substantially intersecting relationship at a chord common to both, and likewise the same with the bottom convolutions, means imparting turning to the tie wire gripper means about the axes of the tie wires to oppose the bends of the hook-lie parts of the tie wires with the appropriate end convolutions of the two successive lines of springs, and traction means applying a pull to the leading row of the two lines of springs away from the position at which the said bends of the projecting parts of the tie wires are positioned opposite the spring ends so that the bends of the tie wire projections link the two rows of springs together, said traction means drawing the second mentioned row of springs in the position occupied previously by the said first mentioned row of springs, said traction means incorporating jaws which during traction of the work apply a clinching action to the hook-like parts of the tie wires, the clinching action being effected by utilising the movement of translation of the traction applying means to drive means actuating the jaws to maintain them apart at a work-receiving stage, bringing them together during an intermediate part of the traction stage to clinch the tie wire projections on to the spring ends and at a final stage to separate the jaws to free the work for a repetition of the cycle operations.

4. A machine for assembling furniture spring assemblies each of which comprises a number of parallel rows of furniture springs coupled together by tie wires parallel with and alternating with the springs and each formed with a number of sinuous hook-like parts projecting laterally therefrom and interlaced with overlapping end convolutions of a successive pair of the springs, such machine comprising a row of pairs of spring positioning devices adapted to grip a spring between each pair; means to feed tie wires in pairs in succession towards said row of springs held in said positioning devices so as to locate the tie wires across the insides of the end convolutions of said springs; gripper means operated automatically to grip the ends of the tie wires; means to locate a further row of springs adjacent to said first row of springs; means to rotate said gripper means axially of the tie wires to engage the hook-like parts of the latter with the two rows of springs to link them together; a first set of clinching jaws adapted to engage a row of springs adjacent to the hook-like parts of the tire wires and reciprocable to draw the rows of springs a distance sufficient to bring said second row to the position formerly occupied by said first row; a second set of clinching jaws engageable with said first set during such movement to effect clinching of the hook-like parts of the tie wires; and means to separate the two sets of clinching jaws and to return said first set to a position to engage the next successive row of springs.

5. Apparatus according to claim 4 wherein there is a pivoting connection between said spring positioning device and said spring locating means thereby to form a spring table, driving means for said first clinching jaw, a pivoting connection between one end of said spring table and said driving means, a pin carried by the remote end of such spring table and reciprocal in a slot in a fixed part of the apparatus, whereby advancement of said driving means causes breaking of said spring table to position the springs for interengagement by the tie wires.

6. Apparatus according to claim 5, wherein there is a lost motion connection between said driving means and said spring table.

7. Apparatus according to claim 6, wherein said lost motion connection comprises a pin carried by said driving means co-operating with a slot in said spring positioning device.

8. Apparatus according to claim 7, wherein catch means are provided for rendering said lost motion means ineffective.

9. Apparatus according to claim 4 wherein ejection means are provided to disengage a clinched tie wire from the clinching jaws.

10. Apparatus according to claim 9, wherein said ejection means comprise a lever caused to pivot by a cam surface on said driving means.

11. Apparatus according to claim 5, wherein the means affording relative movement between the two clinching jaws is a rack carried by a fixed part of the apparatus and a pinion carried by a part associated with the first clinching jaw and carrying a pin driving the second clinching jaw through a slot.

12. Apparatus according to claim 11, wherein the said rack is carried by the underside of a fixed table to which the spring assembly is delivered.

13. Apparatus according to claim 5, wherein the means affording relative movement between the two clinching jaws comprise a toggle linkage connecting such jaws and carrying a roller traversing a cam surface shaped to cause the effective length of such linkage to vary.

14. Apparatus according to claim 13, wherein said cam surface is formed by a biased swinging cam pivoted to a fixed part of the apparatus in such manner that the said roller travels around the cam as the clinching jaws reciprocate through a cycle.

15. In a machine for assembling furniture springs of the class in which the individual furniture springs are coupled together by tie wires having hook-like parts projecting therefrom; and which each interlaces with overlapping parts of end convolutions two successive springs, two identical clinching mechanisms spaced apart and opposed to each other symmetrically and each comprising a first set of main drivers reciprocable with respect to a fixed part of the mechanism, a platform to receive and initially support one end a convolution of a spring, the other end convolution being likewise supported by the platform of the opposed clinching mechanism so that the spring is under slight compression, first clinching jaws mounted on said main drivers and shaped to engage a coupled spring assembly supported by said platform and adapted to draw the coupled spring assembly rearwardly of the mechanism as the main drivers are retracted, a pair of angularly foldable elements comprising each platform and adapted to support distinctive springs of two successive rows of springs so that the end convolution of one spring slightly overlaps the end convolution of the other spring, means to impart a scissor action to said platform elements to deform the springs to bring their overlapping parts into a position to be interlaced by said hook-like parts of the tie wire prior to said latter retraction of said coupled spring assembly, second clinching jaws carried by said main drivers, and lost motion driving means connected to said main drivers and said second clinching jaws to cause said first and second clinching jaws to approach each other as the drivers are retracted and to recede from each other as the drivers are advanced.

References Cited in the file of this patent

UNITED STATES PATENTS

| | | |
|---|---|---|
| 1,422,326 | Ziler | July 18, 1922 |
| 1,539,326 | Palmer | May 26, 1925 |
| 2,224,708 | Van Stittert | Dec. 10, 1940 |
| 2,330,244 | Saval | Sept. 28, 1943 |
| 2,453,872 | Stauffer | Nov. 16, 1948 |